US010690258B2

(12) United States Patent
Greenberg et al.

(10) Patent No.: US 10,690,258 B2
(45) Date of Patent: Jun. 23, 2020

(54) SYSTEM AND USE METHOD FOR VALVE CONTROLLED BY SOUND

(71) Applicants: Daniel Neil Greenberg, Bellingham, WA (US); Richard Preston Riels, Sedro Woolley, WA (US)

(72) Inventors: Daniel Neil Greenberg, Bellingham, WA (US); Richard Preston Riels, Sedro Woolley, WA (US)

(73) Assignee: CRAB RAFT, INC., Woolley, WA (US)

( * ) Notice: Subject to any disclaimer, the term of this patent is extended or adjusted under 35 U.S.C. 154(b) by 4 days.

(21) Appl. No.: 16/159,710

(22) Filed: Oct. 14, 2018

(65) Prior Publication Data

US 2019/0301634 A1 Oct. 3, 2019

Related U.S. Application Data

(60) Provisional application No. 62/651,273, filed on Apr. 2, 2018.

(51) Int. Cl.
*F16K 31/46* (2006.01)
*F16K 37/00* (2006.01)
*B63B 22/06* (2006.01)

(52) U.S. Cl.
CPC .......... *F16K 31/46* (2013.01); *F16K 37/0025* (2013.01); *B63B 22/06* (2013.01)

(58) Field of Classification Search
CPC ............... F16K 37/0025; F16K 37/005; F16K 37/0041; F16K 31/46; B63B 22/06
See application file for complete search history.

(56) References Cited

U.S. PATENT DOCUMENTS

| 3,775,736 | A | * | 11/1973 | Koomey | H04B 11/00 367/133 |
| 4,300,654 | A | * | 11/1981 | Raymond | G01V 1/133 181/113 |
| 4,507,983 | A | | 3/1985 | Norvell | |
| 4,773,689 | A | * | 9/1988 | Wolters | E21B 19/07 294/195 |
| 5,339,288 | A | * | 8/1994 | Blier | G01V 1/38 367/145 |
| 5,385,207 | A | * | 1/1995 | Cook, Sr. | E21B 34/16 137/624.18 |
| 5,967,178 | A | | 10/1999 | Shrode | |
| 6,167,969 | B1 | | 1/2001 | Schoeffler | |
| 7,534,152 | B1 | | 5/2009 | Lloyd et al. | |
| 10,088,067 | B2 | | 10/2018 | White et al. | |
| 2008/0230623 | A1 | | 9/2008 | Macnow et al. | |
| 2011/0205847 | A1 | * | 8/2011 | Lemenager | E21B 47/122 367/82 |

(Continued)

*Primary Examiner* — Vincent H Tran
(74) *Attorney, Agent, or Firm* — Robert Brownstein (57) ABSTRACT

The invention is a system comprising an electrically controlled valve and subsystems that convert sound to electrical signals such that they can be compared to stored control signatures, and when a match occurs, convey a commensurate control signal to the valve. The valve also contains sensors for its state as well as pressure. That data is converted to sound signals and conveyed to remote sound-to-electric transducers. The invention permits remote control of underwater systems without wires that could include control, valve-state, valve pressure, depth, and location.

8 Claims, 6 Drawing Sheets

(56) References Cited

U.S. PATENT DOCUMENTS

| | | | |
|---|---|---|---|
| 2013/0083627 A1* | 4/2013 | Yates | E21B 47/18 367/83 |
| 2015/0267835 A1* | 9/2015 | Jones | F16K 37/005 251/129.03 |
| 2016/0165805 A1* | 6/2016 | Davis | G05B 15/02 47/58.1 R |

* cited by examiner

SYSTEM AND USE METHOD FOR VALVE CONTROLLED BY SOUND

TECHNICAL FIELD

This is a system for controlling a valve, remotely, using sound.

BACKGROUND OF THE INVENTION

Underwater systems that rely on gas or fluid flow through a valve are typically controlled, remotely, by electrical signals conveyed from a surface vessel or platform. Where an underwater system is put in place for a long duration, the electrical control requires that an electrical umbilical is buoyed on the surface. Should that electrical umbilical be torn loose or severed, the underwater device's flow valve can no longer be controlled remotely and an unmanned submersible or human diver may have to be dispatched to reestablish remote control.

Above the surface of the water, remote control may be implemented using wireless signal transmissions and reception. However, under the surface, such control will not work. For that reason, for example, we use wireless radar above the water's surface and wireless sonar or light below the surface.

By establishing a way to remotely control a device's flow valve, without relying on wires, one can improve reliability and avoid inadvertent mishaps.

BRIEF DESCRIPTION OF INVENTION

The invention herein disclosed and claimed is a valve system for controlling flow of gas or liquid, underwater, using sound rather than electrical energy to control it. In addition it can provide valve-state, pressure, location, depth and other data from appropriate sensors and convey the various back to the surface as encoded sound signals.

A valve controlled by an electrical signal is connected to a microcontrolled processing unit, hereinafter referred to as MCU, which is capable of generating an electrical signal that causes the valve to open, or to close. That MCU is kept in close proximity to the valve. The MCU executes a program wherein sound energy that is sent from the surface to the device is an encoded signal that is captured and compared to a stored control signal or signals. If, for example, the captured signal matches a stored control signal for closing the valve, the MCU generates a response control signal conveyed to the valve which causes it to close. On the other hand, if, the captured signal matches a stored control signal for opening the valve, the MCU generates a response control signal conveyed to the valve which causes it to open. By the timing and duration of open and close periods, one could remotely control flow of gas or liquid from the surface, using sound rather than electrical energy.

The invention also provides two-way communication such that the valve state (open or closed), pressure in the valve, depth, and location can be monitored and converted into analogous sound signals conveyed to a remote sound-to-electric transducer. One benefit is immediate confirmation by the valve of its action in response to a remote control command. Another benefit is having pressure, depth and location information fed back to a controlling operator on the surface.

DETAILED DESCRIPTION OF THE INVENTION

Underwater systems that rely on control of gas or fluid passing through a valve typically rely on electrical control signals to control the valve state (e.g. open or closed). As such, an electrical wire conducting path extends from the underwater system to a surface vessel or platform allowing someone on the vessel or platform to control the valve state by sending the appropriate electrical signal to it via the conducting path. That, in turn, requires that the conducting wire remain tethered and intact. If it comes loose or is severed, electrical control of the underwater system is lost. It may take a submersible vehicle or diver to reestablish connection and control.

If, instead, the electrical control signal were not sent from the surface but, rather, by a subsystem co-located with the underwater system, and the control of that electrical signal was in response to a sound pattern conveyed through the water to that underwater system, there would be no need for a conducting wire path extending from the underwater system to the surface.

To avoid inadvertent valve action caused by extraneous sounds, the controlling sound pattern could be a complex one comprising frequencies, amplitudes and timings unlikely to occur naturally. Furthermore, band-pass filtering could be used to confine signal reception to a relatively narrow band of frequencies to further reduce the possibilities of unintended action in response to naturally occurring sounds.

It is important that any wireless control offers two-way communications between the remote controlling operator and the valve system. As such, the invention herein disclosed and claimed provides two-way communications that supports closed loop control of the valve as well as information about its state, pressure, depth and location.

Figure 1:
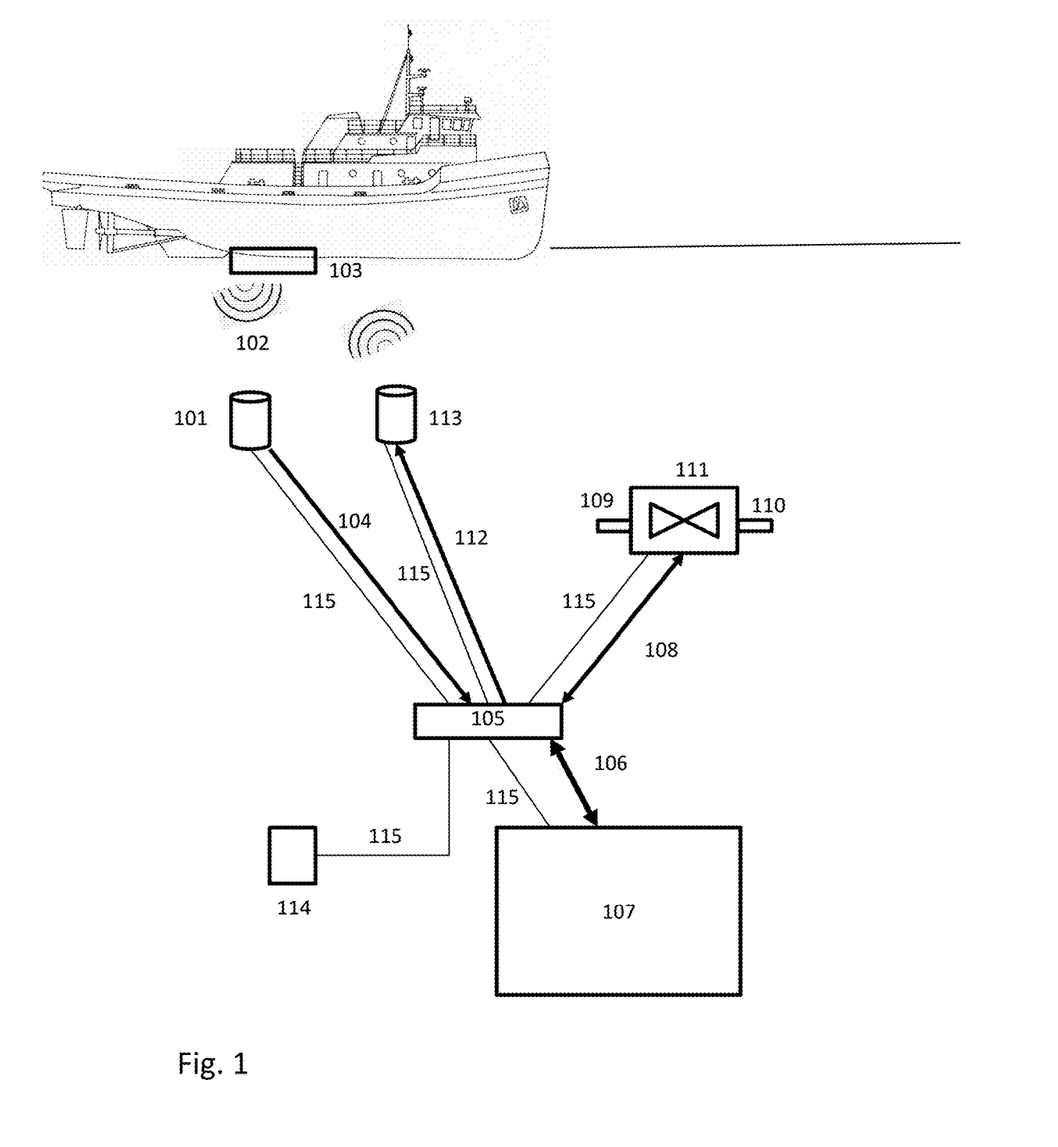
FIG. 1 depicts an embodiment of the system showing all component subsystems.

FIG. 1 depicts an exemplary illustration of the invention system and a method of use. The system comprises a sound-to-electric transducer (101) which can receive encoded sound signals from vessel's remote electric-to-sound and sound-to-electric transducer system (103). The sound signal received by transducer 101 is conveyed along path 104 to an input-output (I/O) subsystem (105) and to a microcontrolled processing unit (107) along path (106). The microcontrolled processing unit (MCU) captures the remotely dispatched control signal and compares it to stored control-signal signatures. For example, if the encoded sound signal encoded a "valve open" command, the MCU would compare its signature to the stored control signal signatures and recognizing that they match, the MCU would then send a response control signal, a valve-open signal, via path 106, to the I/O subsystem (105) and on to the electrically controlled valve (111) via path 108. That would cause the valve to open allowing gas or liquid under pressure attached to its input port (109) to flow through to its output port (110). Note that the electric power source (114) is connected to the other subsystems over path 115.

Figure 2:
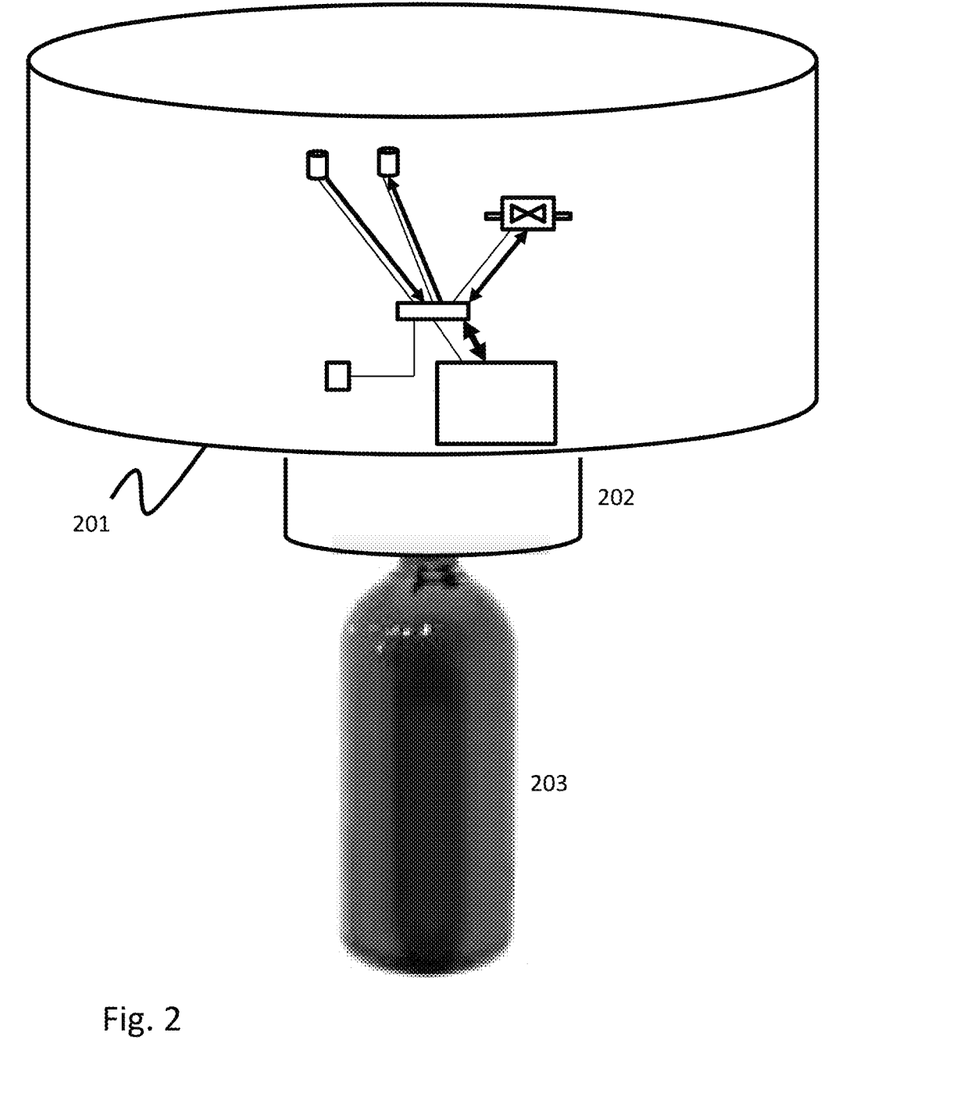
FIG. 2 depicts an embodiment wherein the system is contained within a single enclosure.

Sensors in the valve (not shown) could detect valve state (open or closed), pressure within the valve, and other physical parameters, such as depth and location, and convey those sensors' data signals back along path 108, to the I/O (105), and to the MCU (107). The MCU can encode those sensor data signals, convey them via I/O (105), to an electric-to-sound transducer (113). The sound generated by that electric-to-sound transducer can be detected by the remote sound-to-electric transducer in the vessel's 103 system.

Where the valve is meant to be used with a compressed-gas or compressed-liquid cyclinder, it can be integrated as shown in FIG. 2 such that all the subsystems are contained in a single containment enclosure (201) which is outfitted with a standard interface fitting for attachment to a cylinder (203).

Figure 3:
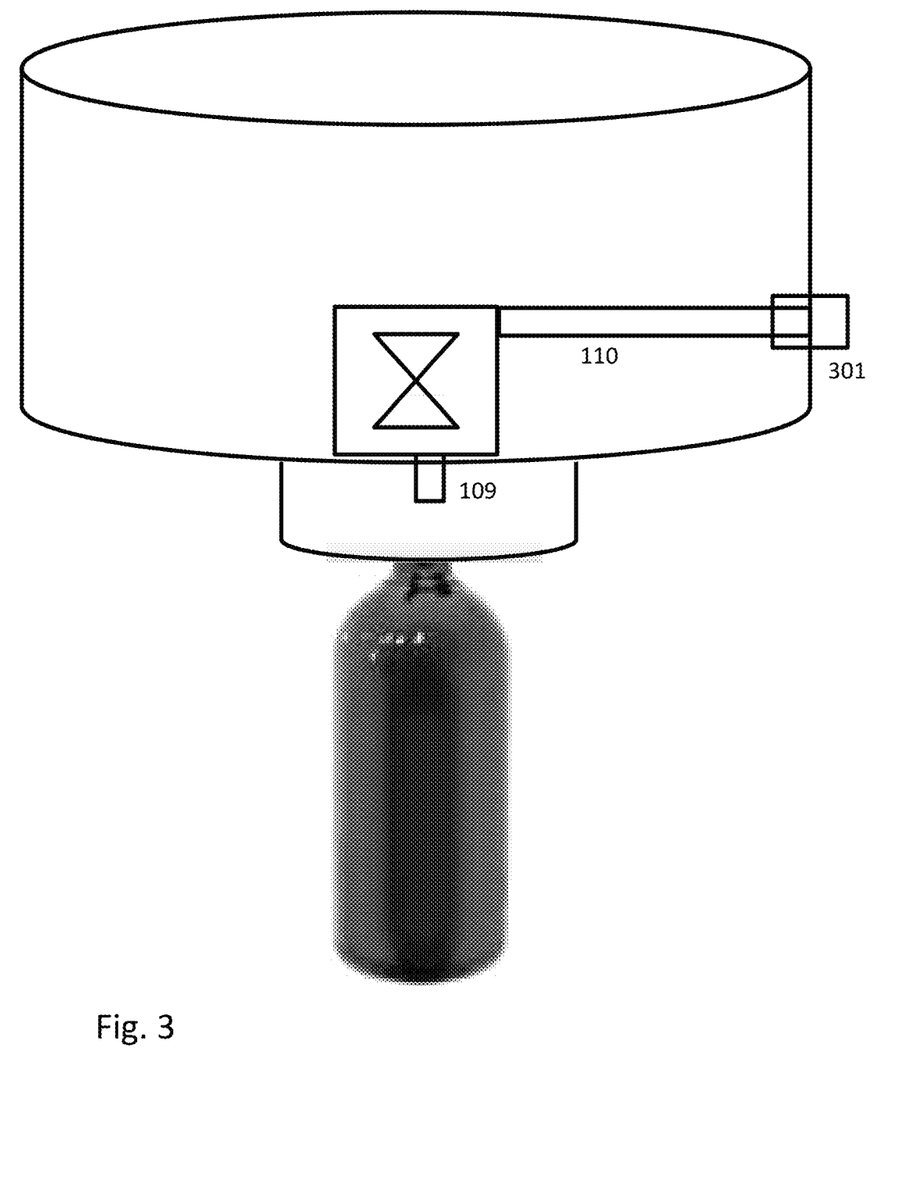
FIG. 3 depicts an embodiment wherein the valve input port and output port are implemented so as to reduce parts and improve reliability.
Figure 4:
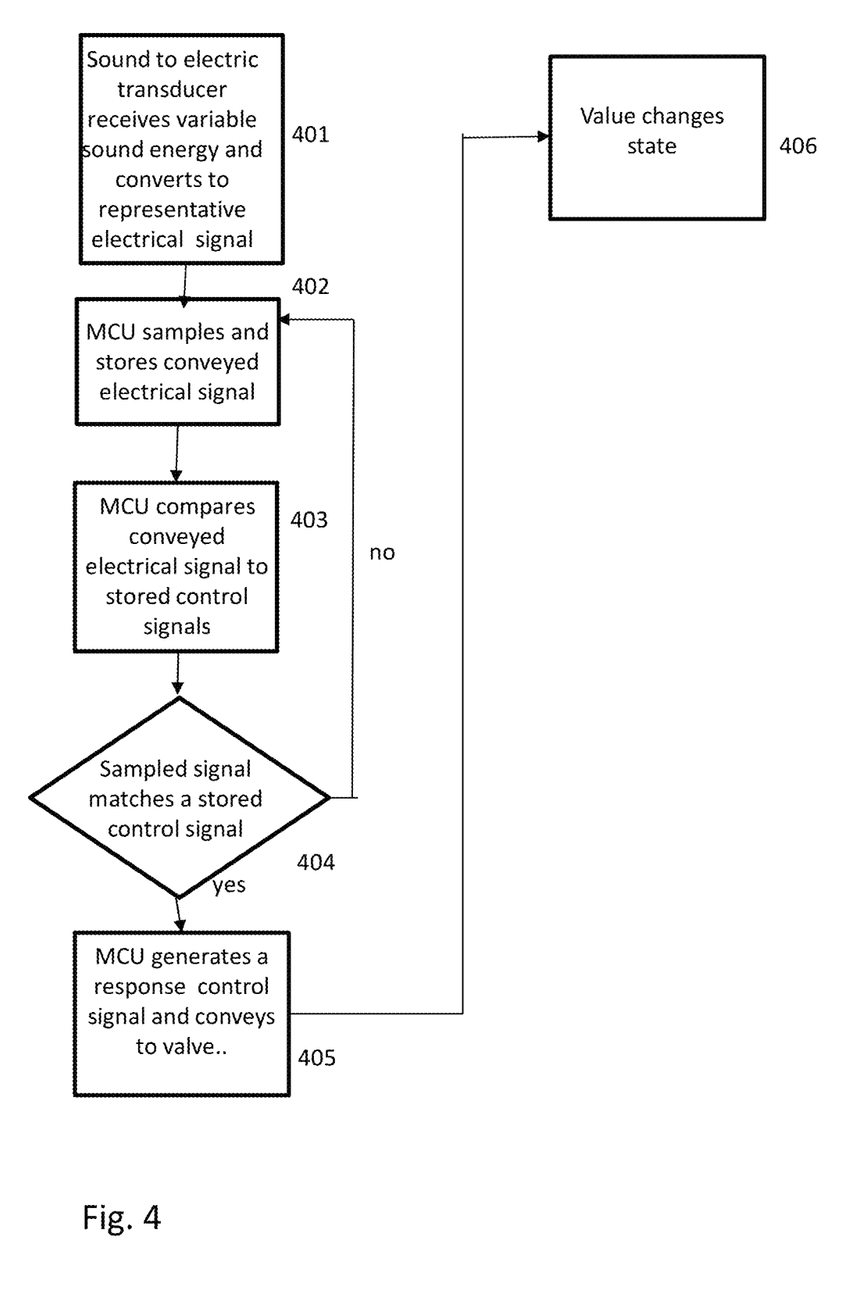
FIG. 4 is a flow diagram representing one method of use embodiment.

As shown in FIG. 3, the valve may be implemented such that its input port is integral to the cylinder interface, and its output port (110) is connected to a standard fitting with external accessibility (301). As such, the cylinder with the invention so attached comprises a complete remotely-controlled cylinder that provides two-way communication and remote valve control. FIG. 4 is a flow diagram that illustrates one method of use embodiment showing remote valve control from a surface position. As shown, the invention's sound-to-electric transducer receives sound signals (401). The signal is conveyed to the MCU which essentially process the signal and compares it to stored control signal signatures (402 and 403). Conditionally (404), if there is no match, the invention system continues to capture, process and compare. If there is a match (404), the MCU generates a response control signal and conveys to the electrically controlled valve (405). The valve responds by changing state (406). In this exemplary embodiment, the valve control operates like a flip-flop trigger in that subsequent repetitions result in a succession of valve state changes.

Figure 5:
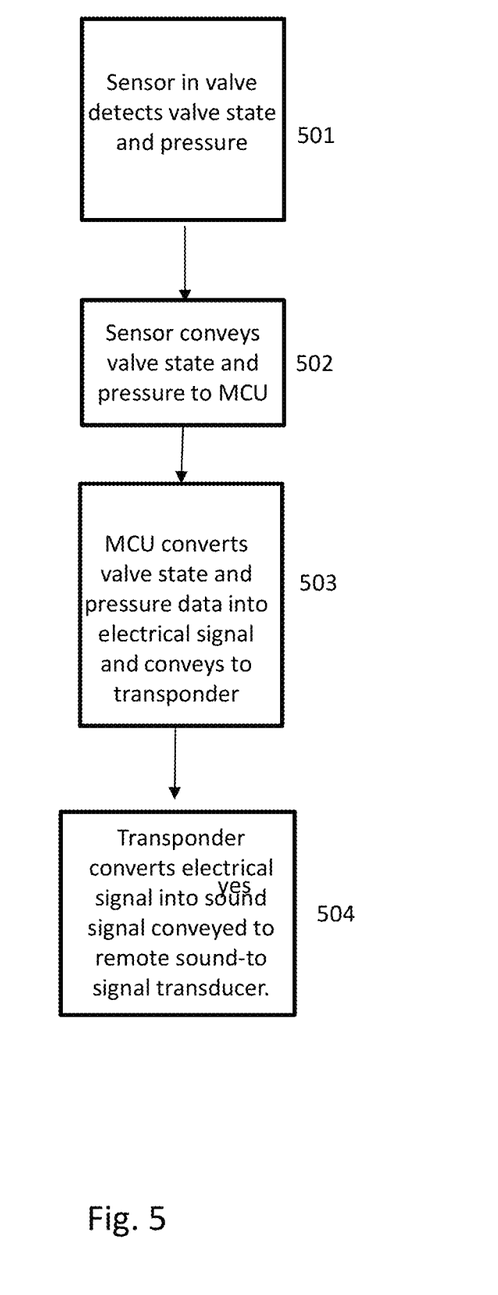
FIG. 5 is a flow diagram representing a second method of use embodiment.

The use method of FIG. 4 requires knowledge of current valve states. To that end, the use method of FIG. 5 can provide that feedback. A sensor in the valve detects valve state and pressure (501). The reading is conveyed by the sensor to the MCU (502), which converts those readings into appropriate signal format and conveys same to the electric-to-sound transducer (503). The electric-to-sound transducer generates a sound signal which is detected by a remote sound-to-electric transducer. Thus, if a signal (as in FIG. 4) commands the valve to change state, the operator knows the state before sending the signal based on the use method of FIG. 5 and can determine if the valve has changed state after the control signal is dispatched.

Figure 6:
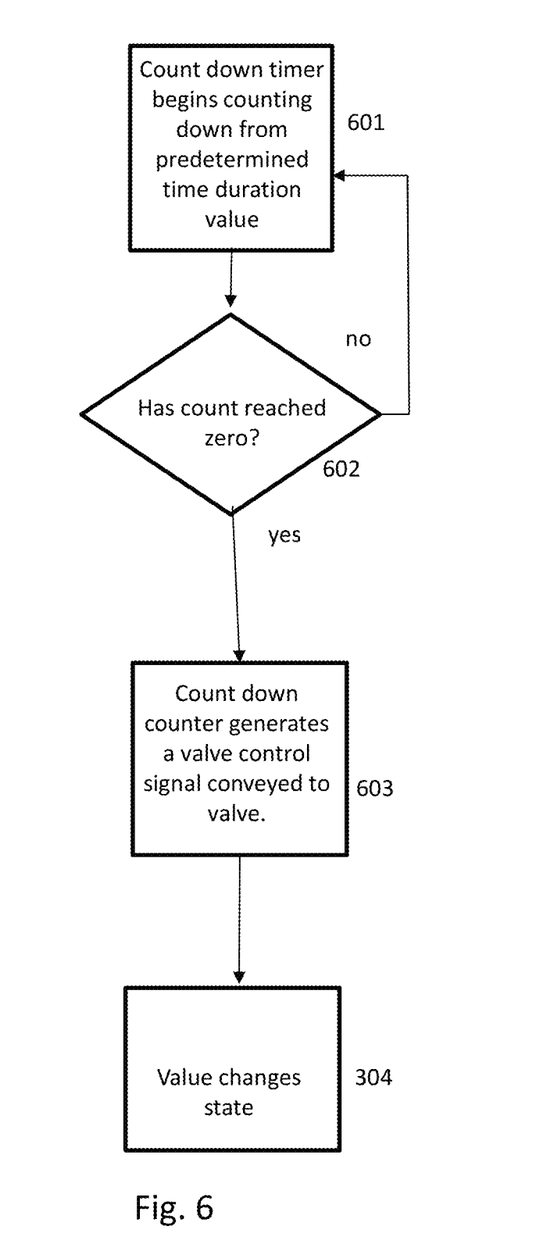
FIG. 6 is a flow diagram representing a third method of use embodiment.

As a safety backup method, the invention system may also comprise an electronic counter which is preset with a predetermined time value based on, say, worst case inaction time. As such, as illustrated in FIG. 6, the counter begins counting down to zero (602). Conditionally, if zero has not yet been reached, the counter continues counting down (602). If zero has been reached, the counter generates a timer control signal and conveys same to the electrically controlled valve (603). Upon receiving that time control signal, the valve changes state. As an example, this use method case might be used where the valve controls a remotely controlled surfacing of a submerged system. In the event that for some reason the remote control commands are not being received and acted on, the counter provides a backup that ensures the valve will open and inflate a buoyancy device.

The counter can be programmed such that if a remote-control command triggers an MCU response control signal, the timer gets reset and begins counting down from the preset value.

The drawings and descriptions are meant to be exemplary and should not be read as limiting invention function or scope. Although the various subsystems are shown as essentially separate entities, they could be partially or fully integrated. The sensors incorporated in the valve subsystem are not limited to valve state, pressure, depth and location. Other parameters and appropriate sensors could be integrated and comprise the invention system.

The system enclosure may have a port to allow charging of rechargeable batteries that comprise the electric power source. The capacity of the electric power source can be modularly chosen to provide extended time between recharging. The integration of the valve into the enclosure's cylinder interface fitting reduces the number of tubes and fittings and therefore may extend the mean-time-between-failure (MTBF) of the invention system.

The invention system comprises a two-way communications system using water as its medium. The MCU could be programmed to enable the invention to participate as a node in a sound-in-water-medium network. As such, the node could be queried for sensor data; or the node could query other nodes for sensor data.

The invention claimed is:

1. What is claimed is a system for control of compressed gas and liquid flow using sound comprising:
   an electrical power source;
   an electrically controlled valve operative to control flow of compressed gas by opening or closing upon receiving an electrical control signal;
   said electrically controlled valve comprising one or more sensors operative to convey sensor data as electrical sensor-data signals;
   said one or more sensors operative to convey location and depth of said electrically controlled valve;
   a sound-to-electric signal transducer operative to convert electrical signals into analogous electrical signals;
   an electric-to-sound signal transducer operative to convert electrical signals into analogous sound signals;
   a remote electric-to-sound signal transducer, deployed on a vessel, operative to convert said electrical signals into said analogous sound signals;
   a remote sound-to-electric signal transducer, deployed on said vessel, operative to convert said sound signals into said analogous electrical signals;
   a microcontrolled processing unit operative to receive encoded control signals originating from said remote electric-to-sound transducer, to decode said encoded control signals, and generate control response signals for conveyance to said electrically controlled valve; and
   said microcontrolled processing unit operative to receive said sensor signals from said electrically controlled valve, to process and convey said sensor signals to said electric-to-sound transducer for conveyance to said remote sound-to-electric transducer.

2. A claim as in claim 1 further comprising:
   an electronic counter operative to count down from a predetermined and preset time value, and after timeout, to convey a timer valve control signal to said electrically controlled valve.

3. A claim as in claim 1 further comprising:
   said electrically controlled valve, said electric power source, said microcontrolled processing unit, said electric-to-sound transducer, and said sound-to-electric transducer contained within one enclosure.

4. A claim as in claim 3 further comprising:
said electrically controlled valve is integrated such that its input port is part of a standard fitting for attachment to a compressed gas cylinder; and
said electrically controlled valve is integrated such that its output port is accessible for attachment through a said standard fitting.

5. A claim as in claim 3 further comprising:
said electronic counter is contained within said one enclosure.

6. A claim is in claim 4 further comprising;
said electronic counter is contained within said one enclosure.

7. A method claim associated with a system for controlling flow of compressed gas using sound comprising:
initializing system by turning on power;
programming electronic counter with predetermined time value;
obtaining location coordinates of said system while above surface;
allowing system to sink below surface to floor of body of water;
sending a sound, underwater, from remote electric-to-sound transducer, located on a vessel, that is encoded control signal requesting system depth data;
receiving said encoded control signal, underwater, by said system's sound-to-electric transducer;
decoding said encoded control signal by said system;
buffering said depth data from said system's depth sensor; and
conveying response signal comprising depth data, under water, to remote sound-to-electric transducer, located on said vessel.

8. A method claim as in claim 7 further comprising:
sending said encoded control signal, comprising valve-control command, from said remote electric-to-sound transducer, located on said vessel, under water, to said system's said sound-to-electric transducer;
receiving by said system's said sound-to-electric transducer said encoded control signal, comprising valve-control command;
decoding, by said system, said encoded control signal, comprising said valve-control command; and
controlling an electrically controlled valve, by said system, performing valve-control action of said encoded control signal comprising said valve-control command.

\* \* \* \* \*